(12) United States Patent
Rong et al.

(10) Patent No.: US 10,904,206 B2
(45) Date of Patent: *Jan. 26, 2021

(54) MULTI-TENANT AWARE DYNAMIC HOST CONFIGURATION PROTOCOL (DHCP) MECHANISM FOR CLOUD NETWORKING

(71) Applicant: INTERNATIONAL BUSINESS MACHINES CORPORATION, Armonk, NY (US)

(72) Inventors: Liang Rong, Jiangsu (CN); Gang Tang, Nanjing (CN); Zi J. Tao, Wuxi (CN); Ming S. Xian, Wuxi (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/526,477

(22) Filed: Jul. 30, 2019

(65) Prior Publication Data

US 2019/0356630 A1 Nov. 21, 2019

Related U.S. Application Data

(63) Continuation of application No. 15/809,146, filed on Nov. 10, 2017, now Pat. No. 10,425,381, which is a
(Continued)

(51) Int. Cl.
*G06F 15/173* (2006.01)
*H04L 29/12* (2006.01)
*H04L 12/46* (2006.01)

(52) U.S. Cl.
CPC ...... *H04L 61/2015* (2013.01); *H04L 12/4633* (2013.01); *H04L 12/4641* (2013.01); *H04L 61/2061* (2013.01); *H04L 2012/4629* (2013.01)

(58) Field of Classification Search
CPC ... H04L 12/4641; H04L 45/50; H04L 45/741; G06F 3/04842
See application file for complete search history.

(56) References Cited

U.S. PATENT DOCUMENTS 7,051,089 B1 5/2006 Johnson et al.
7,152,117 B1 12/2006 Stapp et al.
(Continued)

FOREIGN PATENT DOCUMENTS

CN 101478576 1/2008
CN 103580980 7/2012
(Continued)

OTHER PUBLICATIONS

Narten et al., "Overlays for Network Virtualization Draft-IETF-NVO3-Overlay-Problem-Statement", Internet Engineering Task Force, Apr. 26, 2013, 26 pages.
(Continued)

*Primary Examiner* — Dustin Nguyen
(74) *Attorney, Agent, or Firm* — Stephanie Carusillo; Andrew M. Calderon; Roberts Calderon Safran & Cole, P.C.

(57) ABSTRACT

An approach includes providing support multi-tenancy support on a DHCP protocol. The approach includes receiving a dynamic host configuration protocol (DHCP) packet, inserting a tenant-specific option information within the DHCP packet, and transmitting the DHCP packet with the tenant-specific option information.

20 Claims, 8 Drawing Sheets

Related U.S. Application Data continuation of application No. 14/719,723, filed on May 22, 2015, now Pat. No. 9,887,961.

(56) References Cited

U.S. PATENT DOCUMENTS

| | | |
|---|---|---|
| 7,586,912 B2 | 9/2009 | Agarwal et al. |
| 7,707,277 B2 | 4/2010 | Lange et al. |
| 8,825,839 B2 | 9/2014 | Brandt et al. |
| 9,634,934 B2 | 4/2017 | Thyamagundalu et al. |
| 9,887,961 B2 | 2/2018 | Rong et al. |
| 2009/0279454 A1 | 11/2009 | Wacker et al. |
| 2010/0274924 A1 | 10/2010 | Allan |
| 2010/0275248 A1 | 10/2010 | Li |
| 2011/0213870 A1 | 9/2011 | Cai et al. |
| 2012/0269091 A1 | 10/2012 | Ahrensbach et al. |
| 2013/0086236 A1* | 4/2013 | Baucke ............... H04L 45/50 709/223 |
| 2013/0125124 A1 | 5/2013 | Kempf et al. |
| 2013/0297752 A1 | 11/2013 | Bhanujan et al. |
| 2013/0332577 A1 | 12/2013 | Nakil et al. |
| 2014/0006585 A1 | 1/2014 | Dunbar et al. |
| 2015/0058969 A1 | 2/2015 | Ringdahl et al. |
| 2015/0120962 A1 | 4/2015 | Cai et al. |
| 2015/0124823 A1* | 5/2015 | Pani ................ G06F 3/04842 370/392 |
| 2015/0188769 A1 | 7/2015 | Gu |
| 2015/0334696 A1 | 11/2015 | Gu et al. |
| 2015/0365929 A1 | 12/2015 | Gu et al. |
| 2016/0255045 A1* | 9/2016 | Kolesnik ............ H04L 12/4641 709/222 |
| 2016/0330120 A1* | 11/2016 | Thyamagundalu ... H04L 45/741 |
| 2016/0344687 A1 | 11/2016 | Rong et al. |
| 2018/0077114 A1 | 3/2018 | Rong et al. |

FOREIGN PATENT DOCUMENTS

| | | |
|---|---|---|
| CN | 104253878 | 9/2014 |
| CN | 104468775 | 12/2014 |
| EP | 2866389 | 4/2015 |
| JP | 2010193051 A | 9/2010 |
| JP | 2014509104 A | 4/2014 |
| WO | 2014083449 | 6/2014 |

OTHER PUBLICATIONS

Durairaj et al., "Multi-Tenancy Isolation in Datacenter Networks", Cisco Systems, Inc., IPCOM000212015D, Oct. 25, 2011, 14 pages.

Jain, "Multi-Tenant Isolation and Network Virtualization in Cloud Data Centers", Washington University in Saint Louis, http://www.cse.wustl.edu/~jain/cse570-13/, 2013, 32 pages.

Written Opinion of the International Searching Authority for PCT Application No. PCT/CN2016/082833, dated Jul. 26, 2016, 4 pages.

International Search Report for PCT Application No. PCT/CN2016/082833, 4 pages.

Koichi Onoue, Naoki Matsuoka, Jun Tanaka; "Host-based multi-tenant technology for scalable data center networks"; 2012; ACM/IEEE Symposium on Architectures for Networking and Communications Systems (ANCS); pp. 87-98.

List of IBM Patents or Patent Applications Treated as Related dated Jul. 30, 2019, 1 page.

Chinese Office Action dated Nov. 1, 2019, in related PCT Application No. PCT/CN201680027661.0, 18 pages.

\* cited by examiner

MULTI-TENANT AWARE DYNAMIC HOST CONFIGURATION PROTOCOL (DHCP) MECHANISM FOR CLOUD NETWORKING

TECHNICAL FIELD

The technical character of the present invention generally relates to a Dynamic Host Configuration Protocol (DHCP) mechanism for a cloud networking, and more particularly, to a DHCP mechanism for multi-tenant cloud networking.

BACKGROUND

Multi-tenant support is a basic demand for cloud data center networks, which requires service isolations between different tenants. One type of service isolation is address isolation which provides overlapping addresses to different tenants. In current standards, such as Internet Engineering Task Force Network Virtualization Overlays (IETF NVO3) standards, a virtual network identifier (VNID) is provided to support the separation of virtual networks of different tenants in overlay virtual networks. Addressing and host configuration can be provided through Dynamic Host Configuration Protocol (DHCP), which provides configuration parameters to hosts.

DHCP has two components, including a protocol for delivering host-specific configuration parameters from a DHCP server to a host and a mechanism for allocation of network addresses to hosts. In DHCP, the protocol only supports a configuration in a single address space. Therefore, each DHCP server can only be configured with configuration parameters of a single address space (i.e., the protocol cannot support overlapped address spaces). Thus, the client of the DHCP server can only obtain an address from this single address space.

In order to provide overlapping addresses to different tenants in cloud data center networks, separate DHCP servers must be set up for each tenant. This is usually implemented by setting up a unique DHCP server in a separate LINUX namespace (i.e., operating system level virtualization) or running multiple DHCP servers in different hosts. In these implementations, there is one DHCP server for a tenant, and the addresses provided to different tenants can be overlapped.

However, configuring multiple Linux namespaces is complex and resource/computation intensive since there is usually only one physical network interface card used to connect to the data network. Further, multiple Linux namespaces requires multiple virtual network interfaces to be created and connected to an Ethernet bridge to serve those namespaces and multiple DHCP server instances to be run in which each one of them only serves a single tenant or even a single network segment. Also, there is a lack of scalability when a number of tenants grow into the thousands. Further, many legacy operating systems (e.g., WINDOWS SERVER and legacy LINUX kernels before 2.6.32.xx) do not support LINUX namespaces.

Moreover, there is no inter-operability between overlay networks, even when using overlay encapsulation protocols for multi-tenant support, such as virtual local area network (VLAN), virtual extensible local area network (VXLAN), distributed overlay virtual Ethernet (DOVE), network virtualization using generic routing encapsulation (NVGRE), stateless transport tunneling (STT), generic network virtualization encapsulation (GENEVE), etc. Therefore, such systems do not provide the flexibility required for multi-tenant support.

SUMMARY

In a first aspect of the invention, a method is provided for that includes receiving a dynamic host configuration protocol (DHCP) packet. The method further includes inserting a tenant-specific option information within the DHCP packet. The method further includes transmitting the DHCP packet with the tenant-specific option information.

In another aspect of the invention, there is a computer program product that includes a computer readable storage medium having program code embodied in the storage medium. The program code is not a transitory signal per se, and the program instructions are readable by a computing device to cause the computing device to perform a method that includes receiving a dynamic host configuration protocol (DHCP) packet. The method further includes determining that the DHCP packet comprises tenant-specific option information. The method further includes selecting an address space based on the tenant-specific option information.

In a further aspect of the invention, there is a computer program that includes a computer readable storage medium having program code embodied in the storage medium. The program code is not a transitory signal per se, and the program instructions are readable by a computing device to cause the computing device to perform a method that includes receiving a dynamic host configuration protocol (DHCP) packet which comprises a tenant-specific option information. The method further includes locating a tenant address space based on the tenant-specific option information. The method further includes obtaining a virtual network identifier from a virtual access point (VAP). The method further includes obtaining a subnet configuration corresponding to the obtained virtual network identifier. The method further includes allocating an internet protocol (IP) address which corresponds to the obtained subnet configuration.

In another aspect of the invention, a system is provided that includes a CPU, a computer readable memory, and a computer readable storage medium. Additionally, the system includes one or more program instructions. The system includes program instructions to insert multi-tenancy information within a dynamic host configuration protocol (DHCP) packet. The system further includes program instructions to transmit the DHCP packet with the multi-tenancy information. The program instructions are stored on the computer readable storage medium for execution by the CPU via the computer readable memory.

In another aspect of the invention, a method is provided for configuring a tenant-specific DHCP option frame format that includes configuring a first field of the tenant-specific DHCP option frame format to denote an overlay protocol type that is used for tenant isolation. The method further includes configuring a second field of the tenant-specific DHCP option frame format to uniquely identify a tenant. The method further includes configuring a third field of the tenant-specific DHCP option frame format to denote a virtual network.

Embodiments of the present invention provide systems and methods that implement technical features such as a novel DHCP mechanism for multi-tenant cloud networking, which addresses the issue of address isolation for different tenants in a more efficient manner than current systems. For example, in embodiments of the DHCP mechanism, tenant-specific information is included in a DHCP packet for a scoping of address space. The advantage of the aforementioned technical solution for embodiments of the DHCP mechanism is that it is backwards-compatible, and does not adversely affect currently implemented systems of DHCP processing. Further, if the tenant-specific information is not provided in the DHCP packet, DHCP processing can occur in a manner as current systems. Moreover, in comparison to an address range in the DHCP packet which has a global scope, in the technical features of embodiments of the DHCP mechanism, the address range in the DHCP packet is scoped locally to a tenant's address space when using the DHCP tenant-specific information.

Also, when using the DHCP mechanism of embodiments of the present invention, a single DHCP server is capable of providing DHCP services for multiple tenants, even though their address range may overlap with each other. Thus, in contrast to current systems, there is no need for operating system (OS) level isolation (e.g., LINUX namespace). Further, embodiments of the DHCP mechanism simplify the DHCP service provisioning in multi-tenant cloud data centers. The technical features of embodiments of the DHCP mechanism also address the interoperability issue when a data center network comprises heterogeneous virtual environments offered by different vendors.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
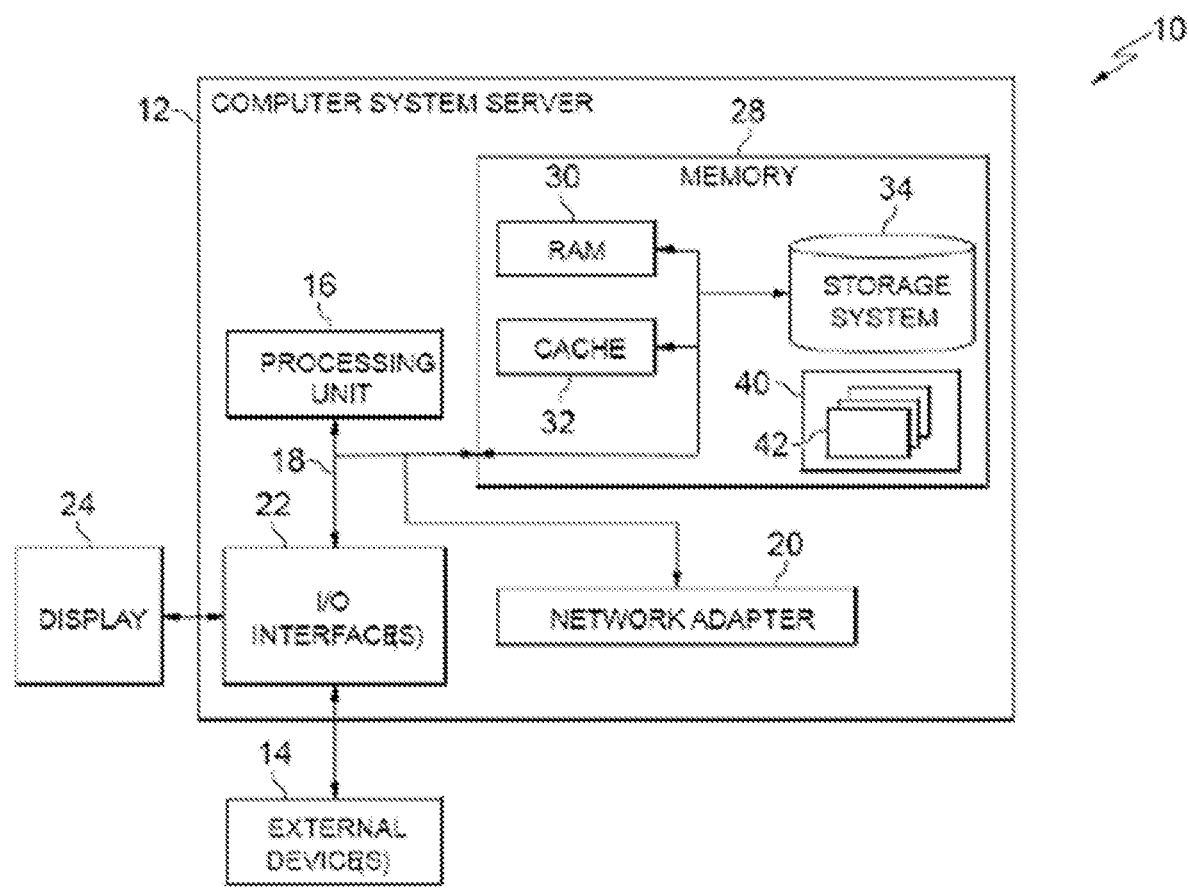
FIG. 1 depicts a cloud computing node according to an embodiment of the present invention.

The technical character of the present invention generally relates to a Dynamic Host Configuration Protocol (DHCP) mechanism for a cloud networking, and more particularly, to a DHCP mechanism for multi-tenant cloud networking. More specifically, embodiments of the present invention provide systems and methods that implement technical features such as a novel DHCP mechanism for multi-tenant cloud networking, which addresses the issue of address isolation for different tenants in a more efficient manner than current systems. For example, in embodiments of the DHCP mechanism, tenant-specific information is included in a DHCP packet for a scoping of address space.

The advantage of the aforementioned technical solution for embodiments of the DHCP mechanism is that it is backwards-compatible, and does not adversely affect currently implemented systems of DHCP processing. Further, if the tenant-specific information is not provided in the DHCP packet, DHCP processing can occur in a manner as current systems. Moreover, in comparison to an address range in the DHCP packet which has a global scope, in the technical features of embodiments of the DHCP mechanism, the address range in the DHCP packet is scoped locally to a tenant's address space when using the DHCP tenant-specific information.

Also, when using the DHCP mechanism of embodiments of the present invention, a single DHCP server is capable of providing DHCP services for multiple tenants, even though their address range may overlap with each other. Thus, in contrast to current systems, there is no need for operating system (OS) level isolation (e.g., LINUX namespace). Further, embodiments of the DHCP mechanism simplify the DHCP service provisioning in multi-tenant cloud data centers. The technical features of embodiments of the DHCP mechanism also address the interoperability issue when a data center network comprises heterogeneous virtual environments offered by different vendors.

In further embodiments of the DHCP mechanism, a single DHCP server providing addressing service is used for multiple tenants in a cloud data center based on overlay networks. Embodiments of the DHCP mechanism help to solve the following technical issues in DHCP systems:

(i) Address space isolation for different tenants in the presence of a DHCP relay agent;

(ii) Address subnet selection for tenant virtual networks with the aid of Network Virtualization Authority (NVA); and (iii) General DHCP service provisioning for heterogeneous virtual environments that comprise a legacy physical infrastructure network and overlay networks with different encapsulation protocols (VLAN, VXLAN, NVGRE, STT, or GENEVE).

Further, embodiments of the DHCP mechanism do not disrupt current DHCP interactions between clients and a server, such as DHCP DISCOVER, OFFER, REQUEST, ACKNOWLEDGMENT, RELEASE, etc. In fact, the DHCP interactions also work in embodiments of the DHCP mechanism of the present invention.

In additional technical features of embodiments of the DHCP mechanism, the tenant-specific option is used as an indicator for a DHCP server to allocate an internet protocol (IP) address on an associated address space specific to that tenant. Hence, a single DHCP server can serve a plurality of tenants, and each tenant can have its own IP address pool for allocation. Moreover, each pool in a tenant is totally independent and can be overlapped (i.e., same IP address pool) with another pool for a different tenant. The tenant-specific option is added to a DHCP header by a DHCP relay agent.

In the technical solutions of the present invention, the tenant-specific option comprises the following fields:

(i) option: should have a unique value, used in known DHCP systems;

(ii) length: total number of bytes of remaining fields;

(iii) transport agent: encoding value to denote the overlay protocol type that is used for tenant isolation (e.g., VLAN, VXLAN, DOVE, NVGRE, STT, etc.);

(iv) tenant ID: a universally unique identifier (UUID) used to identify a tenant; and (v) virtual network ID (VNID): denotes a virtual network, which is an abstract of a L2 segment or broadcast domain. A tenant may have multiple virtual networks.

In further embodiments, the tenant specific option is implemented as a sub-option in a DHCP relay agent information option (option 82, RFC 3046). In embodiments, the implementation adds a sub-option in the option 82 standard to include the proposed tenant-specific option. The tenant-specific option is added to the DHCP header by a DHCP relay agent, which runs on a network virtualization edge (NVE). Since the NVE is on an edge of the overlay network, it is easy to derive the encoding value of a transport agent in the tenant specific option. For example, the VNID can be derived from a virtual access point (VAP) on which the DHCP client connects.

In order to enable multi-tenant support in embodiments of the DHCP mechanism, the DHCP server supports two types of address spaces: global address space and tenant address space. The global address space is compatible with a known DHCP mechanism in which a tenant-specific option is not present in the DHCP packet. In the global address space of a current DHCP mechanism, the IP address ranges cannot be overlapped; whereas, in the technical solution using embodiments of the DHCP mechanism of the present invention, each tenant has a specific address pool in the tenant address space, and the address range in the DHCP mechanism can be overlapped across different tenant's address pool.

In embodiments of the DHCP mechanism, if the DHCP_DISCOVER message does not include the tenant specific option, a DHCP server performs a known DHCP processing. Otherwise, if the DHCP_DISCOVER message includes the tenant specific option, the tenant specific option is used to locate the tenant address space and IP range. The DHCP server locates the address space corresponding to the tenant ID in the tenant-specific option. If the DHCP_DISCOVER message has a subnet selection option (option 118) or a link selection sub-option (sub-option 5 in option 82), the DHCP server will allocate an address from that subnet. Otherwise, if the DHCP_DISCOVER message does not have a subnet selection option or a link selection sub-option, an IP range is associated to a VNID, and the DHCP server will find the IP range according to the VNID in the tenant specific option. Further, embodiments of the DHCP mechanism of the present invention can include a DHCP server which uses a matching criteria or access control list (ACL) rules on the tenant-specific option in the configuration to locate the tenant address space.

In embodiments of the DHCP mechanism of the present invention, a cloud service provider (CSP) may employ various overlay network solutions from different vendors to achieve a multi-tenant cloud data center. Therefore, embodiments of the DHCP mechanism can be utilized when the network size is expanded. In an example, the CSP may have two overlay networks, and these overlay networks may be built on top of a common physical network. A tenant may have virtual machines in both overlay networks. Therefore, in embodiments of the novel DHCP mechanism, there is a convenient way to provision the DHCP server in the physical network in case of a tenant having virtual machines spanning across heterogeneous overlay networks. The transport agent field in a tenant specific option is used to provision the DHCP server.

As the scope of VNID is limited to a single overlay network, in such heterogeneous networks, the DHCP server in embodiments of the DHCP mechanism can use the transport agent, together with VNID, in the tenant specific option, as the classification fields to derive the IP range from which IP addresses are allocated. Thus, to achieve IP address management service for heterogeneous virtual overlay networks with a single DHCP server in a cloud data center, a transport agent may be added as a dimension in the classification criteria to locate the IP address range in the tenant address space.

It is understood in advance that although this disclosure includes a detailed description on cloud computing, implementation of the techniques recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment.

Program modules 42 generally carry out the functions and/or methodologies of embodiments of the invention as described herein. For example, some or all of the functions of a DHCP client 80 can be implemented as one or more of the program modules 42. Additionally, the DHCP client 80 may be implemented as separate dedicated processors or a single or several processors to provide the functionality described herein. In embodiments, the DHCP client 80 performs one or more of the processes described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID (redundant array of inexpensive disks or redundant array of independent disks) systems, tape drives, and data archival storage systems, etc.

Figure 2:
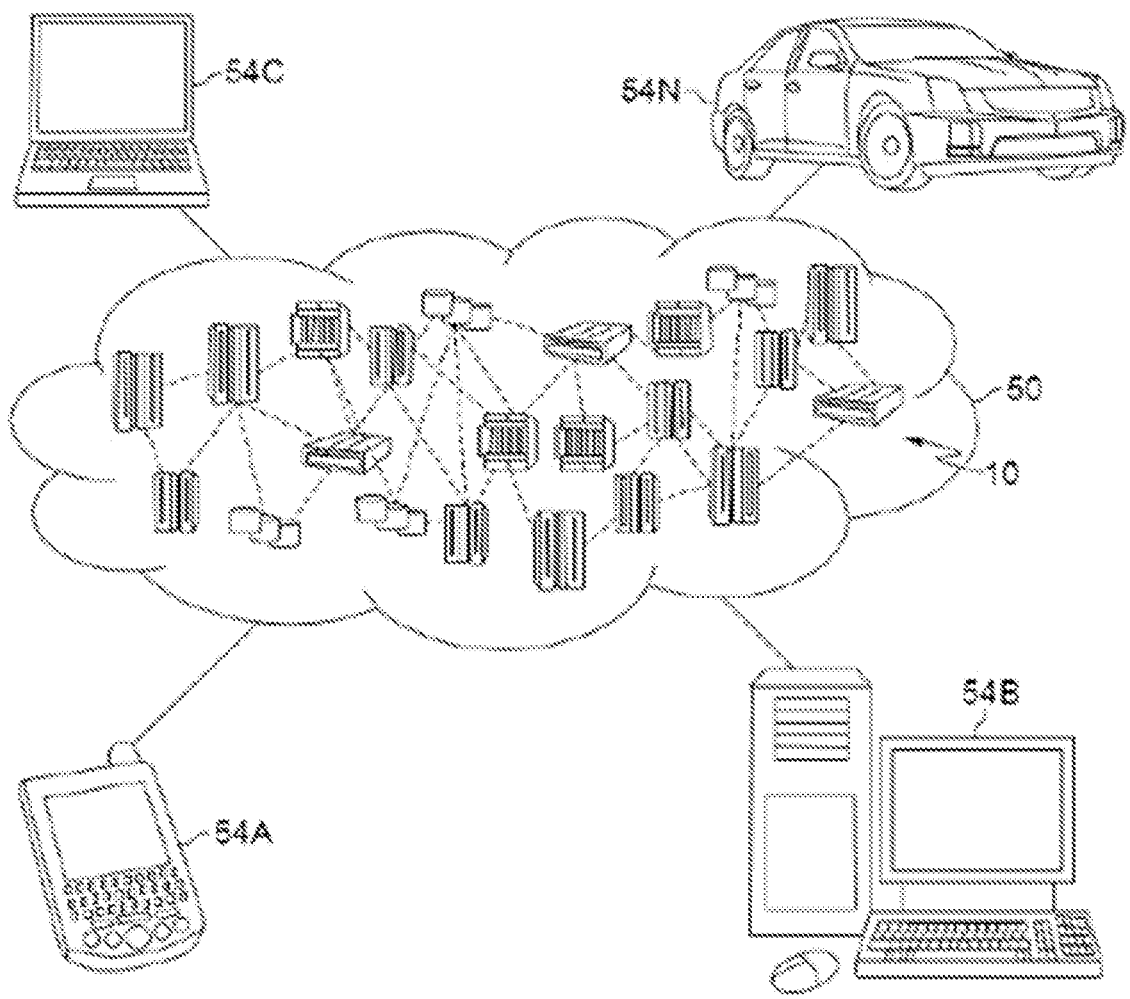
FIG. 2 depicts a cloud computing environment according to embodiments of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
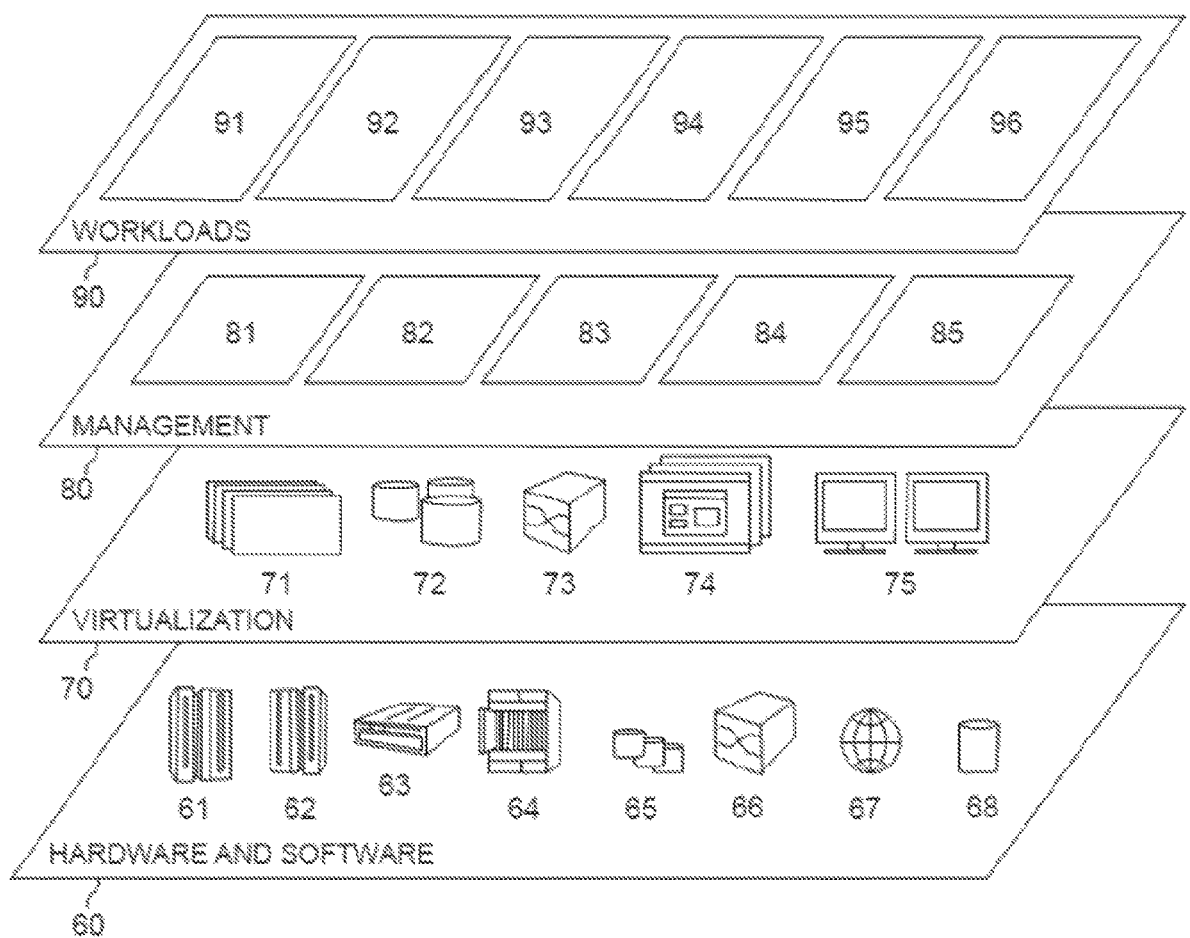
FIG. 3 depicts abstraction model layers according to embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage device 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and DHCP processes 96 described herein. In accordance with aspects of the invention, the DHCP processes 96 workload/function operates to perform one or more of the processes described herein.

Figure 4:
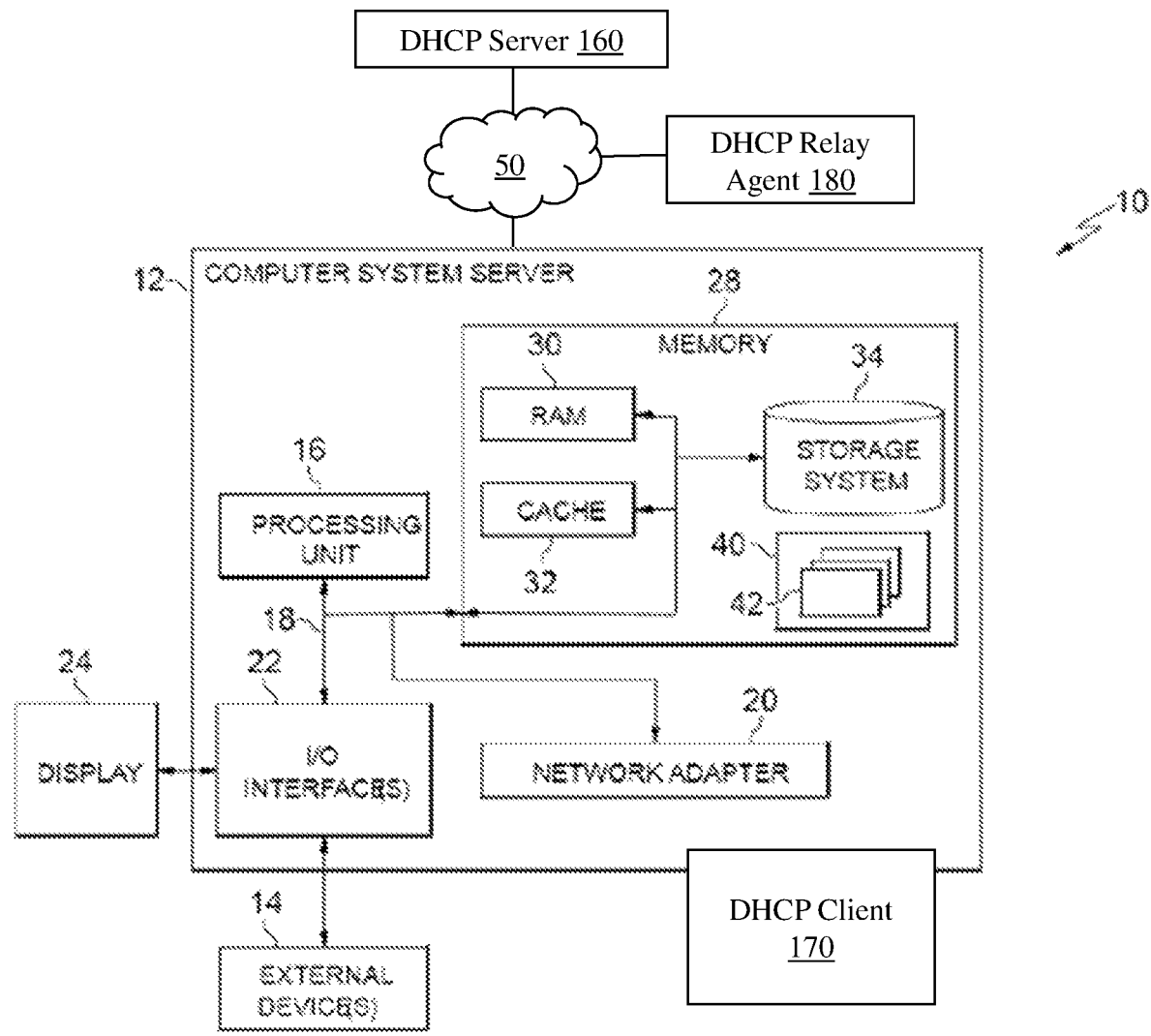
FIG. 4 depicts a cloud computing note according to another embodiment of the present invention.

FIG. 4 depicts a cloud computing node according to another embodiment of the present invention. In particular, FIG. 4 is another cloud computing node which comprises a same cloud computing node 10 as FIG. 1. In FIG. 4, the computer system/server 12 also comprises or communicates with a DHCP client 170, a DHCP server 160, and a DHCP relay agent 180, as described in greater detail herein.

In accordance with aspects of the invention, the DHCP client 170, the DHCP server 160, and the DHCP relay agent 180 can be implemented as one or more program code in program modules 42 stored in memory as separate or combined modules. Additionally, the DHCP client 170, the DHCP server 160, and the DHCP relay agent 180 may be implemented as separate dedicated processors or a single or several processors to provide the function of these tools. While executing the computer program code, the processing unit 16 can read and/or write data to/from memory, storage system, and/or I/O interface 22. The program code executes the processes of the invention.

By way of example, DHCP client 170 may be configured to send a DHCP request packet to a DHCP server 160 via a cloud computing environment 50. As discussed with reference to FIG. 2, for example, cloud computing environment 50 may be the Internet, a local area network, a wide area network, and/or a wireless network. In response to the DHCP server 160 receiving the DHCP request packet, the DHCP server 160 allocates an IP address for the DHCP client 170. In embodiments of the DHCP mechanism, DHCP server 160 may provide direct support for multi-tenancy on the DHCP protocol using a tenant-specific DHCP option to carry tenant information. Therefore, unlike current systems which require operating system virtualization (e.g., each tenant having a DHCP server running in a separate LINUX namespace), the DHCP server 160 can support overlapped IP address spaces. In fact, the DHCP server 160 provides numerous advantages and technical solutions over known OS virtualization for multi-tenancy, including addressing inter-operability between different encapsulation protocols for multi-tenant isolation, high scalability (e.g., not as computationally intensive), and seamlessly supports the software defined networking (SDN) address allocation requirement. Further, in FIG. 4, a DHCP relay agent 180 may be used as an intermediary to relay messages between DHCP client 170 and DHCP server 160 via the cloud computing environment 50. One of ordinary skill in the art would understand that in another embodiment, DHCP client 170 and DHCP server

160 may communicate directly with each other without use of the DHCP relay agent 180.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
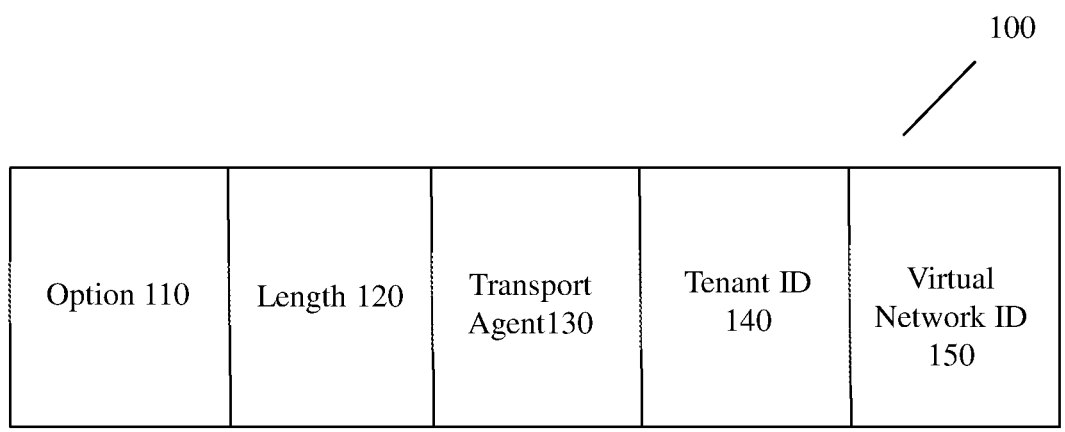
FIG. 5 is a frame format for a tenant-specific DHCP option in accordance with aspects of the present invention.

FIG. 5 is a frame format for a tenant-specific DHCP option in accordance with aspects of the present invention. More specifically, FIG. 5 depicts a tenant-specific DHCP option frame format 100 for carrying tenant information. The tenant-specific DHCP option frame format 100 includes a variety of fields, including, but not limited to option 110, length 120, transport agent 130, tenant ID 140, and virtual network ID 150. Option 110 is a unique value in DHCP options. Length 120 is a total number of bytes of remaining fields. Transport agent 130 is an encoding value used to denote the overlay protocol type that is used for tenant isolation, e.g., VLAN, VXLAN, DOVE, NVGRE, STT, etc. Tenant ID 140 is a universally unique identifier (UUID) used to identify a tenant. Finally, virtual network ID 150 denotes a virtual network, which is an abstract of a L2 segment or broadcast domain.

A tenant may be joined to multiple virtual networks. The tenant-specific DHCP option frame format 100 is an indicator for a DHCP server to allocate an IP address on associated address space to that tenant. Therefore, a single DHCP server can serve a plurality of tenants, and each tenant can have its own IP address pool for allocation. The pools in different tenants are totally independent, and can be overlapped. The tenant-specific option frame format 100 can be added to a DHCP header by a DHCP relay agent. In embodiments, the tenant-specific option is a sub-option in DHCP relay agent information option (option 82, RFC 3046). Therefore, implementation will add a sub-option in the option 82 to include the tenant-specific option frame format 100.

Flow Diagram

Figure 6:
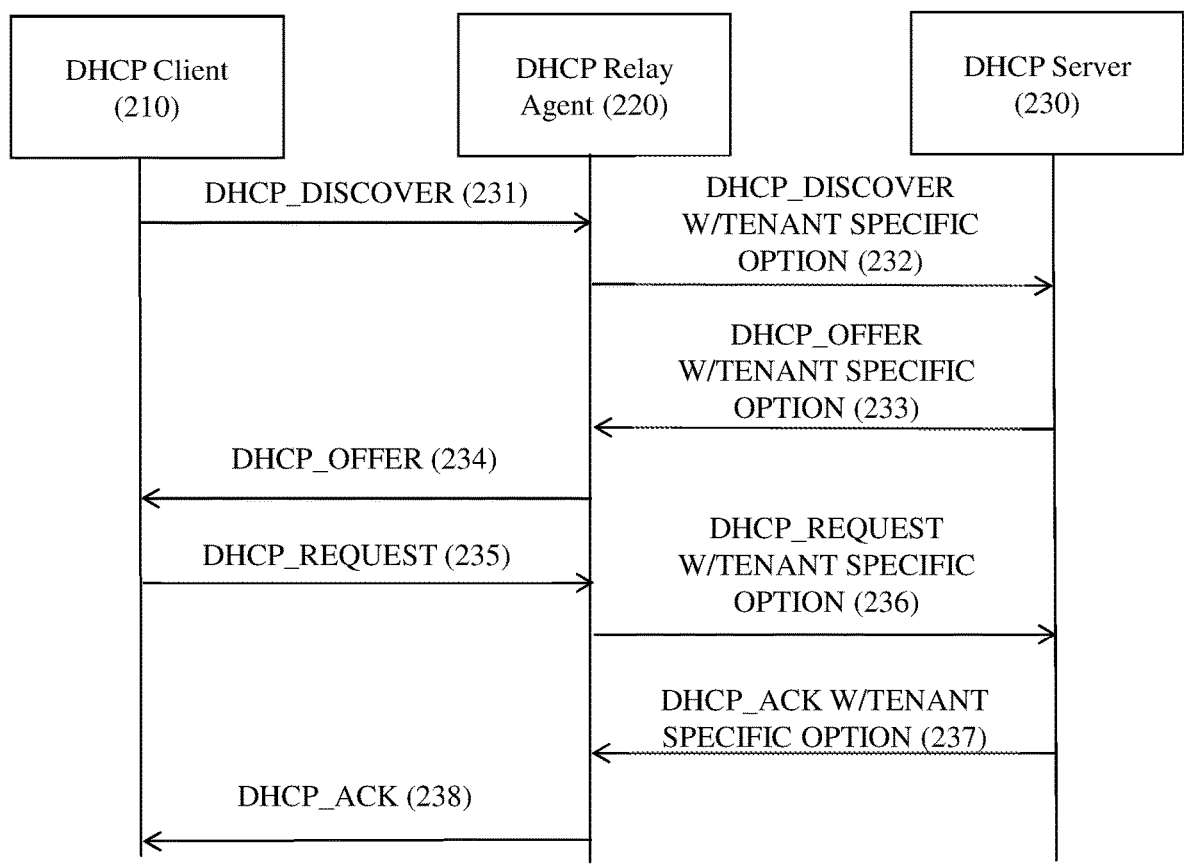
FIG. 6 depicts an exemplary flow (swim diagram) for a DHCP packet processing in accordance with aspects of the present invention.
Figure 7:
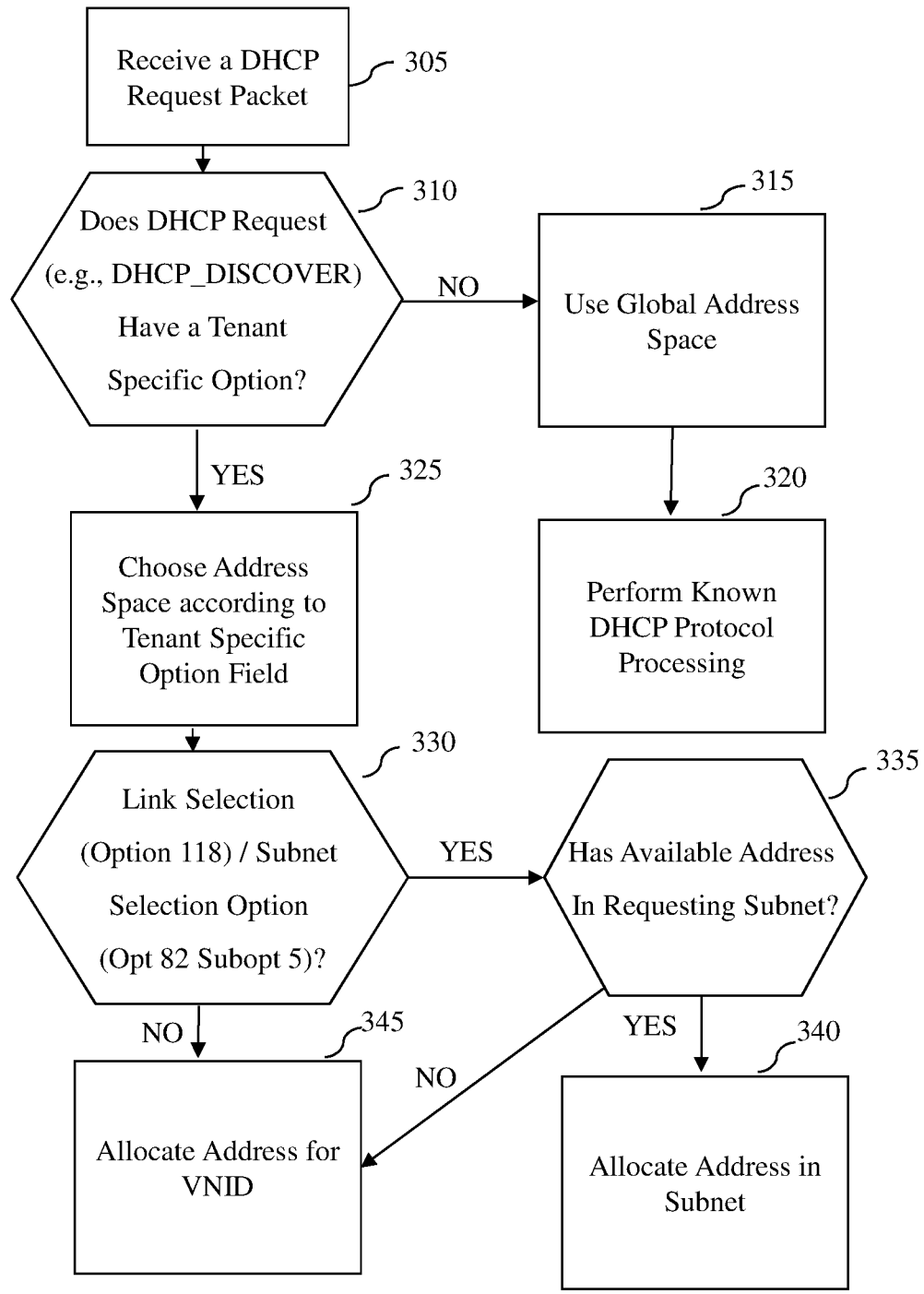
FIG. 7 depicts an exemplary flow for an address allocation processing in accordance with aspects of the present invention.
Figure 8:
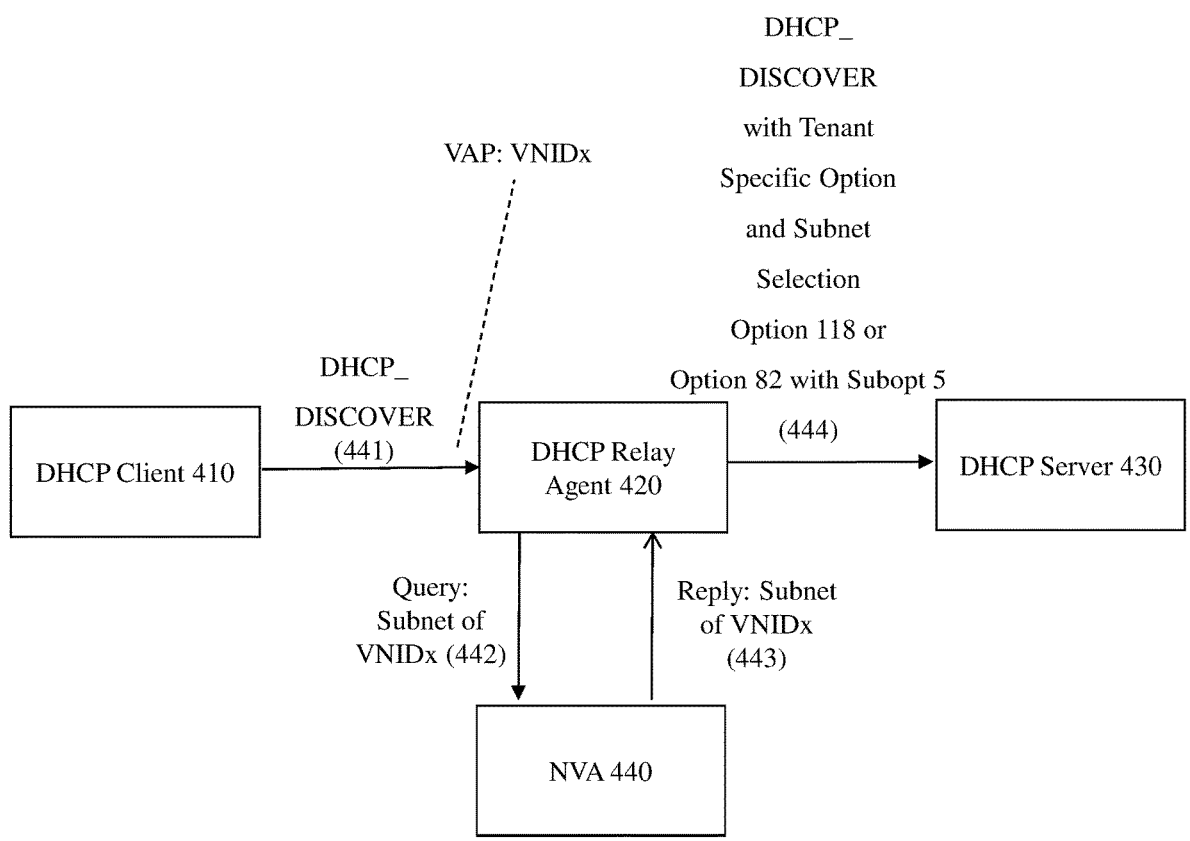
FIG. 8 depicts an exemplary flow for a DHCP subnet selection support in accordance with aspects of the present invention.

FIGS. 6-8 show exemplary flows (or swim lane diagrams) for performing aspects of the present invention. The steps of FIGS. 6-8 may be implemented in the environment of FIGS. 1 and 4, for example. As noted above, the flowchart(s) illustrate the architecture, functionality, and operation of possible implementations of systems, methods, and computer program products as already described herein in accordance with the various embodiments of the present invention. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 6 depicts an exemplary flow (swim diagram) for a DHCP packet processing in accordance with aspects of the present invention. More specifically, FIG. 6 shows a tenant-specific option added to the DHCP header by a DHCP relay agent. Since a network virtualization edge (NVE) is an edge of the overlay network, it is easy to derive the encoding value of the transport agent in the tenant specific option. A virtual network identifier (VNID) can be derived from a virtual access point (VAP) to which the DHCP client connects. The VAP is a logical connection point on the NVE for connecting a tenant system to a virtual network. VAPs can be physical ports or virtual ports identified through logical interface identifiers, such as VLAN ID or internal vSwitch Interface ID connected to a virtual machine (VM). The tenant ID in the tenant-specific option can be derived through the VNID by consulting the local cache or remote database in NVA that consists of the mapping between VNID and tenant ID.

In current DHCP relays, for each L2 segment it serves, a gateway IP interface is needed, on which DHCP client packets on that L2 segment will be received. Therefore, in current DHCP systems, upon receiving a DHCP message from a DHCP client, the IP address of the IP interface will be filled in the GIADDR field of the DHCP packet if it is zero, and the DHCP message is sent to the DHCP server. In other words, the GIADDR is added by the first DHCP relay agent. The DHCP server will use the GIADDR to allocate the IP address and other network parameter to the DHCP client. The DHCP server will send a corresponding DHCP relay message to a DHCP relay agent identified by the GIADDR. The DHCP relay agent is designed to send the DHCP reply message to the directly connected DHCP clients—the clients in the same L2 segment as the IP interface of the DHCP relay agent identified by the GIADDR.

In contrast, as shown in FIG. 6, DHCP clients are running in the overlay network, and the overlay networks of different tenants are isolated. The DHCP server is designed to serve all the DHCP clients in different tenant overlay networks. The DHCP server and DHCP relay agents will communicate through the underlay network. The GIADDR added by the DHCP relay agent will be an underlay IP address of the relay agent. The DHCP server will not use the GIADDR to allocate the IP address and other network parameters to DHCP client. The DHCP server will use the tenant-specific option and other options to allocate the IP address and other network parameters to the DHCP client. The DHCP server will send a corresponding DHCP reply message to a DHCP relay agent identified by the GIADDR. The relay agent will use the VNID in tenant-specific option to deliver the DHCP reply message to the DHCP client accordingly.

More specifically, FIG. 6 depicts an exemplary flow or swim lane diagram for a DHCP packet processing in accordance with aspects of the present invention. FIG. 5 includes the following actors: DHCP client 210 (an example of DHCP client 170 described with regard to FIG. 4), DHCP relay agent 220 (an example of DHCP relay agent 180 with regard to FIG. 4), and DHCP server 230 (an example of DHCP server 160 described with regard of FIG. 4).

In FIG. 6, in the DHCP packet processing, at step 231, a DHCP client 210 sends a DHCP_DISCOVER message to a DHCP relay agent 220. Then, at step 232, the DHCP relay agent 220 sends a DHCP_DISCOVER with tenant specific option message to DHCP server 230. In step 233, the DCHP server 230 then sends a DHCP_OFFER with tenant specific option message to DHCP relay agent 220. At step 234, DHCP relay agent 220 sends a DHCP_OFFER message to DHCP client 210. Then, at step 235, DHCP client 210 sends a DHCP_REQUEST message to the DHCP relay agent 220. The DHCP relay agent 220 sends a DHCP_REQUEST with tenant specific option message to DHCP server 230, at step 236. At step 237, DHCP server 230 sends a DHCP_ACK with tenant specific option message to DHCP relay agent 220. Finally, at step 238, DHCP relay agent 220 sends a DHCP_ACK message to DHCP client 210.

FIG. 7 depicts an exemplary flow for an address allocation processing in accordance with aspects of the present invention. In FIG. 7, to enable multi-tenant support in the novel DHCP mechanism of the depicted embodiment, the DHCP server supports two types of address spaces: global address space and tenant address space. The global address space is compatible with current DHCP methods in which a tenant-specific option is not present in the DHCP packet. In the global address space of current DHCP methods, the IP address ranges cannot be overlapped; whereas, in contrast, in the technical solutions of the DHCP mechanism of the depicted embodiment of the present invention, each tenant has a specific address pool in the tenant address space. The address range in the DHCP mechanism of the depicted embodiment can be overlapped across different tenant's address pool.

For example, in the DHCP mechanism shown in FIG. 7, if the DHCP_DISCOVER message does not include the tenant specific option, the DHCP server performs a known DHCP processing. Otherwise, if the DHCP_DISCOVER message includes the tenant specific option, the tenant specific option is used to locate the tenant address space and IP range. The DHCP server locates the address space corresponding to the tenant ID in the tenant-specific option. Also, in FIG. 7, if the DHCP_DISCOVER message has a subnet selection option (option 118) or a link selection sub-option (sub-option 5 in option 82), the DHCP server will allocate an address from that subnet. Otherwise, if the DHCP_DISCOVER message does not have a subnet selection option or a link selection sub-option, an IP range is associated to a VNID, and the DHCP server will find the IP range according to the VNID in the tenant specific option. Further, the novel DHCP mechanism of the depicted embodiment can include a DHCP server which uses a matching criteria or access control list (ACL) rules on the tenant-specific option in the configuration to locate the tenant address space.

More specifically, in FIG. 7, in the address allocation processing, at step 305, a DHCP server receives a DHCP request packet. At step 310, the processes and systems of the DHCP server determine whether the DHCP request (e.g., DHCP_DISCOVER) has a specific option. If the DHCP request does not have a tenant specific option (i.e., NO), at step 315, the DHCP server uses a global address space. Then, at step 320, known DHCP protocol processing is performed by the DHCP server and the DHCP client, since there is no tenant specific option.

Alternatively, at step 310, if the DHCP request (e.g., DHCP_DISCOVER) does have a tenant specific option (i.e., YES), at step 325, an address space is chosen by the DHCP server according to the tenant specific option field. Further, at step 330, a determination is made by the DHCP server as to whether there is either a link selection (option 118) or a subnet selection option (opt 82 subopt 5) in the DHCP request. If there is no link (i.e., NO) at step 345, an address is allocated for VNID by the DHCP server. Alternatively, at step 330, if there is either a link selection (option 118) or a subnet selection option (opt 82 subopt 5) in the DHCP request (i.e., YES), then at step 335, there is a check by the DHCP server whether an available address in a requesting subnet. At step 335, if there is an available address in the requesting subnet (i.e., YES), at step 340, an address is allocated in the subnet by the DHCP server. Alternatively, at step 335, if there is not an available address in the requesting subnet (i.e., NO), at step 345, an address is allocated for VNID by the DHCP server.

FIG. 8 depicts an exemplary flow for a DHCP subnet selection support in accordance with aspects of the present invention. In FIG. 8, in the DHCP subnet selection support in accordance with aspects of the present invention, a DHCP client 410 sends a DHCP_DISCOVER message to a DHCP relay agent 420 in step 441. When the DHCP relay agent 420 receives the DHCP_DISCOVER message, DHCP relay agent 420 locates the tenant address space according to the tenant ID in the tenant specific option and allocates an IP address in the intended subnet. As shown in FIG. 7, the DHCP relay agent 420 derives its VNID from an associated VAP. Then, in FIG. 8, at step 442, the DHCP relay agent 420 sends a query subnet of VNIDx message to a network virtualization authority (NVA) 440 to inquire of the subnet configuration of that VNID. A reply for the subnet of VNIDx is sent by the NVA 440 to the DHCP relay agent in step 443. Finally, at step 444, the DHCP_DISCOVER with tenant specific option and subnet selection option 118 or option 82 with subopt 5 is sent to DHCP server 430.

In FIG. 8, a DHCP subnet selection option (option 118, RFC3011) and a link selection in relay agent information option (option 82, suboption 5, RFC3527) are used to communicate to a DHCP server on a desired subnet from which the DHCP clients expect to obtain their IP address. Therefore, the novel DHCP mechanism of the depicted embodiment can be easily extended to these situations through NVA.

As shown in FIG. 8, a NVA can maintain the subnet configuration for each VNID. In response to receiving each DHCP_DISCOVER packet from DHCP client 410, the DHCP relay agent 420 derives its VNID from the associated VAP. After that, the DHCP relay agent 420 sends a query to NVA 440 to inquire of the subnet configuration of that VNID. The subnet configuration, which is replied by NVA 440, is then filled in the DHCP portion 118 or option 82—suboption 5. The subnet information is then communicated to DHCP server 430 together with the tenant-specification option. When DHCP server 430 receives the DHCP_DISCOVER packet, DHCP server 430 locates the tenant address space according to tenant ID in the tenant specific option and allocates an IP address in the intended subnet which is carried in the DHCP option 118 or option 82—suboption 5.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

As should now be understood by those of skill in the art, in embodiments of the present invention, the DHCP mechanism provides numerous advantages over current systems. These advantages include, but are not limited to, providing direct support for multi-tenancy on DHCP protocol and removing the need of LINUX namespace OS-level virtualization to support multi-tenancy. In embodiments of the present invention, this technical solution is accomplished by formulating a tenant-specific DHCP option to carry tenant information and improving an address allocation scheme on a DHCP server to prioritize IP address allocation on the tenant address space once tenant-specific option is detected in the DHCP packet.

Also, both the DHCP client and the DHCP relay agent can add tenant-specific option. Moreover, in embodiments, an interoperability issue between different encapsulation protocols for multi-tenant isolation (e.g., VLAN, VXLAN, DOVE, NVGRE, STT, etc.) is alleviated.

Moreover, embodiments of the DHCP mechanism provide high scalability as the number of tenants grows. For example, in current systems, OS-virtualization to support multi-tenancy increases computational burden because each instance of a LINUX namespace requires additional resources; whereas, in embodiments of the DHCP mechanism of the present invention, computational burden is reduced in comparison to OS-level virtualization. Further, in embodiments of the DHCP mechanism, a SDN address allocation requirement is seamlessly supported because each DHCP client gets correct addresses belonging to its tenant and its connected virtual network.

In still further advantages to a technical problem, the systems and processes described herein provide a computer-implemented method for multi-tenancy support on a DHCP protocol, on a network. In this case, a computer infrastructure, such as the computer system shown in FIGS. 1 and 4 or the cloud environment shown in FIG. 2 can be provided and one or more systems for performing the processes of the invention can be obtained (e.g., created, purchased, used, modified, etc.) and deployed to the computer infrastructure. To this extent, the deployment of a system can comprise one or more of:

(i) installing program code on a computing device, such as computer system shown in FIG. 1, from a computer-readable medium;

(ii) adding one or more computing devices to the computer infrastructure and more specifically the cloud environment; and (iii) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product comprising a computer readable storage medium having program instructions embodied therewith, wherein the computer readable storage medium is not a transitory signal per se, the program instructions executable by a dynamic host configuration protocol (DHCP) relay agent computing device to cause the DHCP relay agent computing device to:

receive a DHCP packet from a DHCP client;

insert a tenant-specific option information within the DHCP packet, wherein the tenant-specific option information is an indicator to a DHCP server to allocate an internet protocol address on an associated address space specific to a tenant in a multiple tenant cloud data center based on overlay networks; and transmit the DHCP packet with the tenant-specific option information to the DHCP server via an underlay network.

2. The computer program product of claim 1, wherein the tenant-specific option information is selected from at least one of the group consisting of: a transport agent field used to denote an overlay protocol type that is used for tenant isolation; and a tenant identification field used to uniquely identify the tenant.

3. The computer program product of claim 2, wherein the overlay protocol type is selected from one of the group consisting of: a virtual local area network (VLAN); virtual extensible local area network (VXLAN); distributed overlay virtual ethernet (DOVE); network virtualization using generic routing encapsulation (NVGRE); stateless transport tunneling (STT); and generic network virtualization encapsulation (GENEVE).

4. The computer program product of claim 1, wherein the tenant-specific option information comprises a virtual network identification field used to denote a virtual network.

5. The computer program product of claim 1, wherein the tenant-specific option information is inserted in a DHCP header of the DHCP packet.

6. The computer program product of claim 1, wherein the DHCP packet is received at the DHCP relay agent computing device and the tenant-specific option information is inserted within the DHCP at the DHCP relay agent computing device.

7. The computer program product of claim 6, wherein the DHCP packet with the tenant-specific option information is transmitted from the DHCP relay agent computing device to a DHCP server.

8. The computer program product of claim 1, wherein the programming instructions are further configured to transmit an internet protocol (IP) address to a DHCP client which corresponds with a tenant identification field of the tenant-specific option information.

9. The computer program product of claim 8, wherein the IP address transmitted to the DHCP client corresponds with the tenant identification field of the tenant-specific option information and overlaps with an IP address of a different independent tenant.

10. A system comprising:
a processor, a computer readable memory and a computer readable storage medium associated with a dynamic host configuration protocol (DHCP) server;
program instructions to receive a DHCP packet;
program instructions to determine that the DHCP packet comprises tenant-specific option information, wherein the tenant-specific option information is an indicator to the DHCP server to allocate an internet protocol address on an associated address space specific to a tenant in a multiple tenant cloud data center based on overlay networks; and
program instructions to select the associated address space based on the tenant-specific option information, wherein the program instructions are stored on the computer readable storage medium for execution by the processor via the computer readable memory.

11. The system of claim 10, wherein the selecting the associated address space based on the tenant-specific option information comprises:
determining that the DHCP packet with the tenant-specific option information has at least one of a link selection sub-option and a subnet selection option;
determining that an address is available in a requested subnet when the DHCP packet is determined to have at least one of the link selection sub-option and the subnet selection option; and
allocating the address in the requested subnet when the address is available in the requested subnet.

12. The system claim 11, wherein the selecting the associated address space based on the tenant-specific option information further comprises allocating an address for a virtual network identifier in response to a determination that the DHCP packet does not have at least one of the link selection sub-option and the subnet selection option.

13. The system of claim 12, wherein the selecting the associated address space based on the tenant-specific option information further comprises allocating an address for a virtual network identified in response to a determination that the address is not available in the requested subnet.

14. The system of claim 11, further comprising program instructions to allocate a global address space in response to a determination that the received DHCP packet is devoid of the tenant-specific option information.

15. A computer program product comprising a computer readable storage medium having program instructions embodied therewith, wherein the computer readable storage medium is not a transitory signal per se, the program instructions executable by a dynamic host configuration protocol (DHCP) relay agent computing device to cause the DHCP relay agent computing device to:
   insert multi-tenancy information within a DHCP packet, the multi-tenancy information including tenant-specific option information indicating to a DHCP server to allocate an internet protocol address on an associated address space specific to a tenant in a multiple tenant cloud data center; and
   transmit the DHCP packet with the multi-tenancy information to the DHCP server.

16. The computer program product of claim 15, wherein the multi-tenancy information is selected from at least one of the group consisting of: a transport agent field used to denote an overlay protocol type that is used for tenant isolation; a tenant identification field used to uniquely identify the tenant; and a virtual network identification field used to denote a virtual network.

17. The computer program product of claim 15, wherein the tenant-specific option information comprises a transport agent field used to denote an overlay protocol type that is used for tenant isolation, and the overlay protocol type is selected from one of the group consisting of: a virtual local area network (VLAN); virtual extensible local area network (VXLAN); distributed overlay virtual ethernet (DOVE); network virtualization using generic routing encapsulation (NVGRE); stateless transport tunneling (STT); and generic network virtualization encapsulation (GENEVE).

18. The computer program product of claim 15, wherein the program instructions further cause the DHCP relay agent computing device to transmit an internet protocol (IP) address to a DHCP client which corresponds with a tenant identification field of the tenant-specific option information.

19. The computer program product of claim 18, wherein the IP address transmitted to the DHCP client corresponds with the tenant identification field of the tenant-specific option information and overlaps with an IP address of a different independent tenant.

20. The computer program product of claim 15, wherein the program instructions further cause the DHCP relay agent computing device to:
   configure a first field of a tenant-specific DHCP option frame format to denote an overlay protocol type that is used for tenant isolation in overlay virtual networks;
   configure a second field of the tenant-specific DHCP option frame format to uniquely identify a tenant in the multiple tenant cloud data center; and
   configure a third field of the tenant-specific DHCP option frame format to denote a virtual network of the overlay virtual networks, wherein the second field is used by the DHCP server to locally scope an address range to an address space of the tenant.

* * * * *